United States Patent [19]

Tanoue

[11] Patent Number: 4,608,881
[45] Date of Patent: Sep. 2, 1986

[54] LOWER BEARING FIXING DEVICE FOR A STEERING MAIN SHAFT OF A STEERING SYSTEM IN AUTOMOTIVE VEHICLES

[75] Inventor: Tsuyoshi Tanoue, Okazaki, Japan

[73] Assignee: Toyota Jidosha Kabushiki Kaisha, Toyota, Japan

[21] Appl. No.: 786,707

[22] Filed: Oct. 11, 1985

Related U.S. Application Data

[63] Continuation of Ser. No. 461,194, Jan. 26, 1983, abandoned.

[30] Foreign Application Priority Data

Jan. 27, 1982 [JP] Japan ............... 57-010423[U]

[51] Int. Cl.⁴ .................................................. B62D 1/16
[52] U.S. Cl. .................................... 74/492; 280/779; 411/427; 384/541
[58] Field of Search ................. 74/492; 280/779; 308/189 R; 403/362; 411/427, 537, 538; 384/621, 622, 623

[56] References Cited

U.S. PATENT DOCUMENTS

| | | | |
|---|---|---|---|
| 1,972,581 | 9/1934 | Barker | 308/236 X |
| 3,280,466 | 10/1966 | Heimberger | 411/427 X |
| 3,791,233 | 2/1974 | Bane | 74/492 |
| 4,177,685 | 12/1979 | DeLancey | 403/362 X |
| 4,277,984 | 7/1981 | Numazawa et al. | 74/492 |
| 4,406,176 | 9/1983 | Numazawa et al. | 74/492 |

FOREIGN PATENT DOCUMENTS

| | | | |
|---|---|---|---|
| 114663 | 9/1980 | Japan | 74/492 |
| 114664 | 9/1980 | Japan | 74/492 |
| 251597 | 4/1948 | Switzerland | 411/427 |

Primary Examiner—Kenneth J. Dorner
Assistant Examiner—Dwight G. Diehl
Attorney, Agent, or Firm—Finnegan, Henderson, Farabow, Garrett & Dunner

[57] ABSTRACT

A device for fixing the lower bearing of the steering main shaft to the column tube in an automotive vehicle comprising; a bearing retainer fixed on the outer periphery of the lower bearing; a nut fitted into the bearing retainer so as to non-directionally incline, the outer periphery of the nut being spherically shaped; and a hole formed through the column tube at the position opposed to the nut and adapted to receive a bolt.

5 Claims, 3 Drawing Figures

LOWER BEARING FIXING DEVICE FOR A STEERING MAIN SHAFT OF A STEERING SYSTEM IN AUTOMOTIVE VEHICLES

This application is a continuation of application Ser. No. 06/461,194, filed Jan. 26, 1983 now abandoned.

BACKGROUND OF THE INVENTION

This invention relates to a device for fixing a lower bearing for rotatably supporting a steering main shaft in a column tube of a steering system in an automotive vehicle.

Generally, in assembling a bearing retainer, which retains the lower bearing, to a column tube, it is required for the lower bearing to be easily and securely fixed on the column tube even if there exists some discrepancy between a predetermined axial and circumferential positions of the column tube and those of the steering main shaft and to fully transmit a push-up force acting on the steering main shaft through wheel side to the column tube.

SUMMARY OF THE INVENTION

Accordingly, it is an object of the present invention to provide a device for fixing a lower bearing to a steering column tube which may satisfy the above-mentioned requirements with a reduced number of parts and a simple structure.

According to the invention, the column tube is formed with holes for receiving bolts thereinto at its outer circumference and is fixed to the lower bearing by a retainer. The retainer is provided with nuts at a predetermined position for engaging bolts. The outer periphery of the nuts is spherically shaped so as for the nuts to non-directionally incline relative to the retainer.

The invention will be more fully understood from the following detailed description and appended claims when taken with the drawings.

DETAILED DESCRIPTION OF THE PREFERRED EMBODIMENTS

Figure 1:
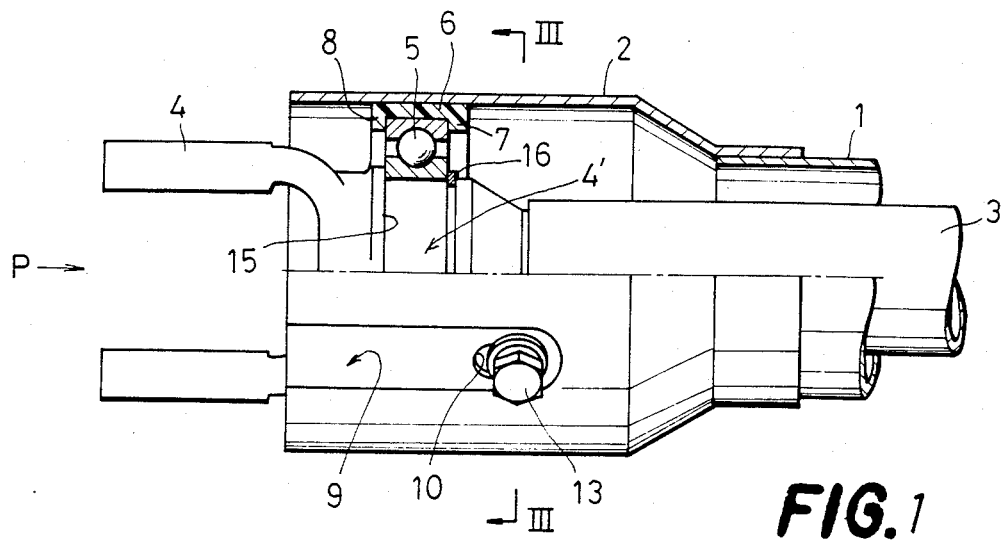
FIG. 1 is a side view illustrating the lower side of the steering column, partially in section, according to the present invention.

Referring now to FIG. 1 illustrating the lower side of a steering column, a column tube 1 is fixed to a lower tube 2 at its one end. A steering main shaft 3 is received in the column tube 1 and one of yokes 4 of a universal joint is fixed to the main shaft 3 at one end thereof. A lower bearing 5 is mounted on the outer circumference of an axial member 4' of the yoke 4 for rotatably supporting the main shaft 3 relative to the column tube 1. In other words, the inner race of the lower bearing 5 is positioned by an annular projection 15 formed on the axial member 4' and a snap ring 16 fitted in a circular groove formed on the axial member 4', so as to prevent the axial movement of the lower bearing 5. The outer race of the lower bearing 5 is fixedly embedded into the inner circumference of a bearing retainer 6 having a channel section and made of resin upon molding of the retainer 6. In other words, the bearing retainer 6 is formed with annular projections 7 and 8 and serves to retain the outside of the outer race of the lower bearing 5 so as not to move in the axial direction thereof.

Figure 3:
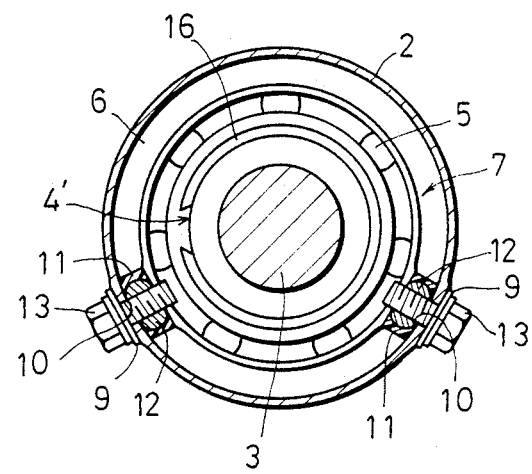
FIG. 3 is a sectional view taken along the line III—III in FIG. 1.

As is best seen in FIG. 3, the lower tube 2 is formed with two rectangular and axially extending flat portions 9 at its outer circumference. Each flat portion 9 is formed with respective hole 10 elongated in the axial direction of the main shaft 3 for receiving respective bolt 13 thereinto as shown in FIG. 1.

Figure 2:
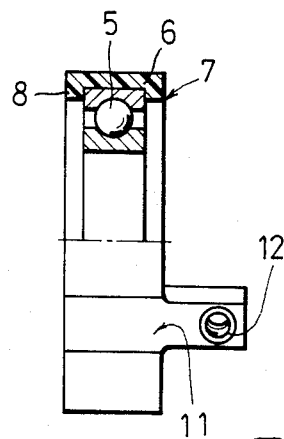
FIG. 2 is a side view illustrating the bearing retainer, partially in section, of FIG. 1.

As is apparent from FIGS. 2 and 3, the bearing retainer 6 is formed with two axially extending arms 11 which are in opposed positions relative to the flat portions 9 of the lower tube 2. Each arm 11 has a rectangular surface opposed to the inner surface of the lower tube 2 and is formed with respective hole at the predetermined positions thereof for fitting respective nut 12. The outer periphery of the nut 12 is spherically shaped to permit the axis of the bore of nut 12 to be universally inclined relative to the retainer 6. The bolts 13 are inserted into the holes 10 from the outside of the flat portions 9 and are secured to the nuts 12. A frictional force larger than a torque of securing the bolts 13 into the holes of the arm 12 exists between the outer periphery of the nuts 12 and the inner periphery of the holes of the arm 11.

In operation, when load axially acts on the main shaft 3 from a wheel side as depicted by an arrow P in FIG. 1, it acts to push up the lower bearing 5 and the bearing retainer 6. The push-up force is securely received on the lower tube 2 through the nuts 12 and the bolts 13. In the event that the axial assembling position of the main shaft 3 with respect to the column tube 1 permits scatter because of error in measurement in manufacturing the respective element, the fixing position of the bearing retainer 6 relative to the lower tube 2 may be axially adjusted within the elongation of the hole 10. As the bolts 13 are directly secured to the nuts 12 from the outside of the lower tube 2 in this embodiment, the number of parts may be reduced and the assembling work may be simplified.

In the event that the circumferential assembling position of the main shaft 3 with respect to the column tube 1 permits scatter because of error in measurement in manufacturing the respective element, the bolts 13 are inclined with respect to the radial direction of the column tube 2 and the nuts 12 may be inclined in association with the bolts 13, thereby assuring the engagement of the bolts 13 with the nuts 12.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a steering system of an automotive vehicle which includes a steering main shaft inserted into a column tube, a lower tube attached to the lower end of said column tube and a lower bearing having an inner race and an outer race and provided at the lower of end said steering main shaft, a device for fixing the lower bearing of the steering main shaft to the lower tube comprising:

a. a bearing retainer attached to the outer periphery of the lower bearing, said retainer including at least one integrally-formed, elongated arm axially projecting from a portion of said retainer;

b. at least one nut fitting into the end of said arm remote from said bearing retainer so as to universally incline relative to said arm, the outer periphery of said nut being spherically shaped; and c. at least one axially-elongated hole formed through said lower tube at a position opposed to said nut and adapted to receive at least one bolt.

2. The device as in claim 1 wherein the surface of said arm opposed to said hole is rectangular.

3. The device as in claim 1 wherein said retainer includes a channel section which retains the outside of the outer race of said lower bearing.

4. The device as in claim 1 wherein said lower tube has at least one axially-extending rectangular flat portion on the outer periphery thereof and wherein said hole is in said rectangular flat portion.

5. The device of claim 1 wherein said bearing retainer includes two said arms, each extending in the same axial direction and being circumferentially spaced from the other.

* * * * *